(12) United States Patent
Palmer

(10) Patent No.: US 6,260,797 B1
(45) Date of Patent: Jul. 17, 2001

(54) TRANSFORMABLE GUN LAUNCHED AERO VEHICLE

(75) Inventor: Miles R. Palmer, Great Falls, VA (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/229,599

(22) Filed: Jan. 13, 1999

Related U.S. Application Data

(60) Provisional application No. 60/071,006, filed on Jan. 13, 1998.

(51) Int. Cl.[7] ............................. B64C 3/56; B64C 39/00
(52) U.S. Cl. ................................................ 244/49; 102/501
(58) Field of Search ........................... 244/3.27, 5, 45 A, 244/49; 102/348, 501, 503

(56) References Cited

U.S. PATENT DOCUMENTS

| | | | |
|---|---|---|---|
| H1534 | 6/1996 | Fritch | 102/473 |
| 3,224,369 | * 12/1965 | Dunn et al. | 102/348 |
| 3,463,420 | * 8/1969 | Butler et al. | 244/49 X |
| 3,944,168 | 3/1976 | Bizien et al. | 244/3.28 |
| 4,440,360 | * 4/1984 | Hallstrom | 244/49 X |
| 4,471,923 | * 9/1984 | Hoopner et al. | 244/49 X |
| 4,601,442 | * 7/1986 | Friedel et al. | 244/49 X |
| 4,664,338 | * 5/1987 | Steuer et al. | 244/49 X |
| 4,869,442 | 9/1989 | Miller | 244/3.28 |
| 5,111,748 | 5/1992 | Thurner et al. | 102/387 |
| 5,467,681 | 11/1995 | Liberman | 244/3.1 X |
| 5,615,847 | 4/1997 | Bourlett | 244/63 |
| 5,695,153 | 12/1997 | Britton et al. | 244/63 |

* cited by examiner

Primary Examiner—Robert P. Swiatek
(74) Attorney, Agent, or Firm—Banner & Witcoff, Ltd.

(57) ABSTRACT

A transformable gun launched aero vehicle having a ballistic projectile configuration and an aeroplane configuration includes a cylinder forming a shell of the vehicle in the ballistic projectile configuration and wings deployable from the cylinder. The wings are capable of achieving sufficient lift for sustained flight in the aeroplane configuration. The cylinder forms a fuselage of the vehicle in the aeroplane configuration. A wing includes plural rib elements, plural inflatable tubes where each tube is braced by the plural rib elements, and a wind shell disposed around the plural inflatable tubes and the plural rib elements. The vehicle includes an inflatable tail section that is inflated while the vehicle is in the aeroplane configuration. The vehicle includes a parachute that is reversibly deployable from a nose portion of the vehicle. The vehicle includes at least one landing rod. Each landing rod is reversibly extendable from the vehicle. A landing controller controls a first landing rod to extend after the vehicle has begun to vertically descend. The vehicle includes a folding propeller deployable from the fuselage in the aeroplane configuration. The vehicle includes a control system, and the control system includes a module to determine when the vehicle has reached a first predetermined state that defines an initiation of a transition from the ballistic projectile configuration to the aeroplane configuration.

42 Claims, 12 Drawing Sheets

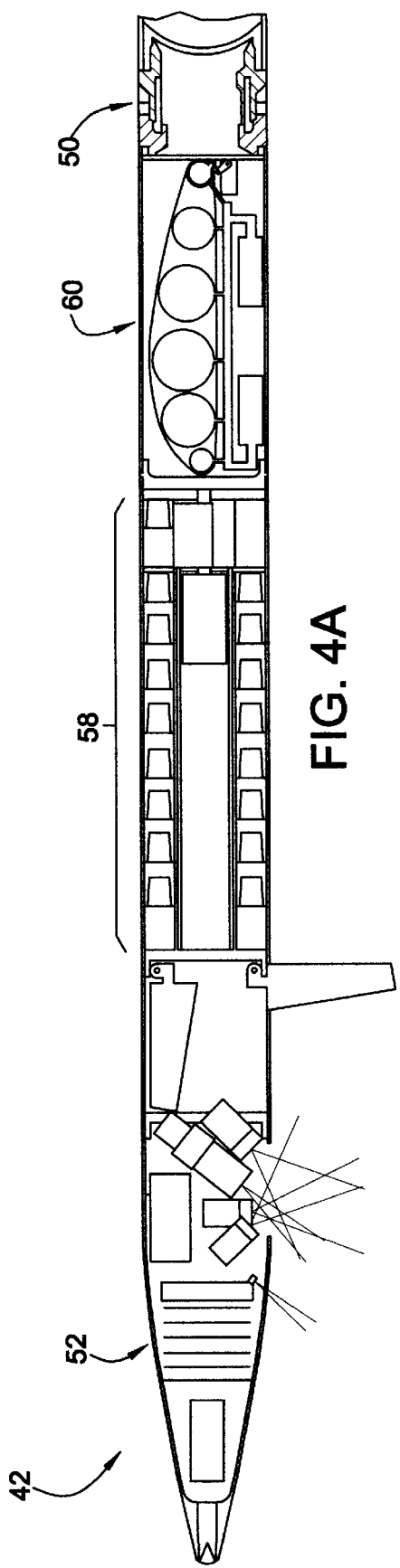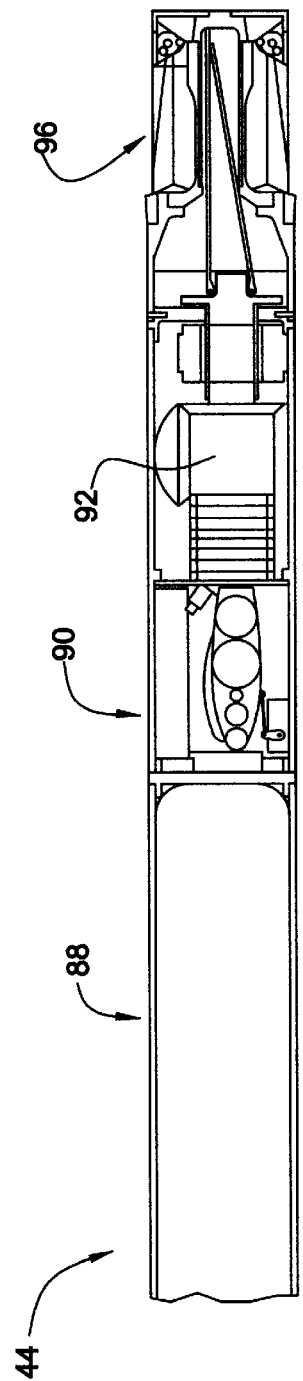

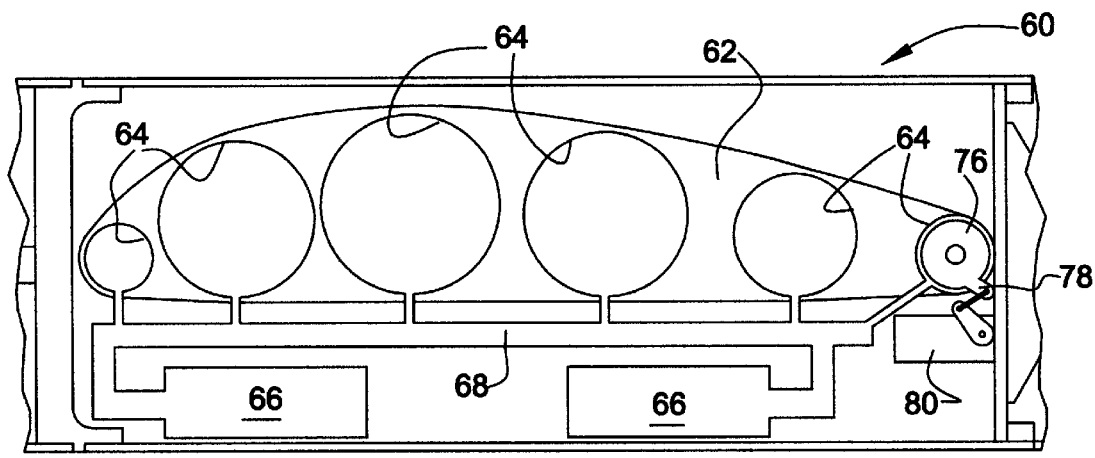
FIG. 5
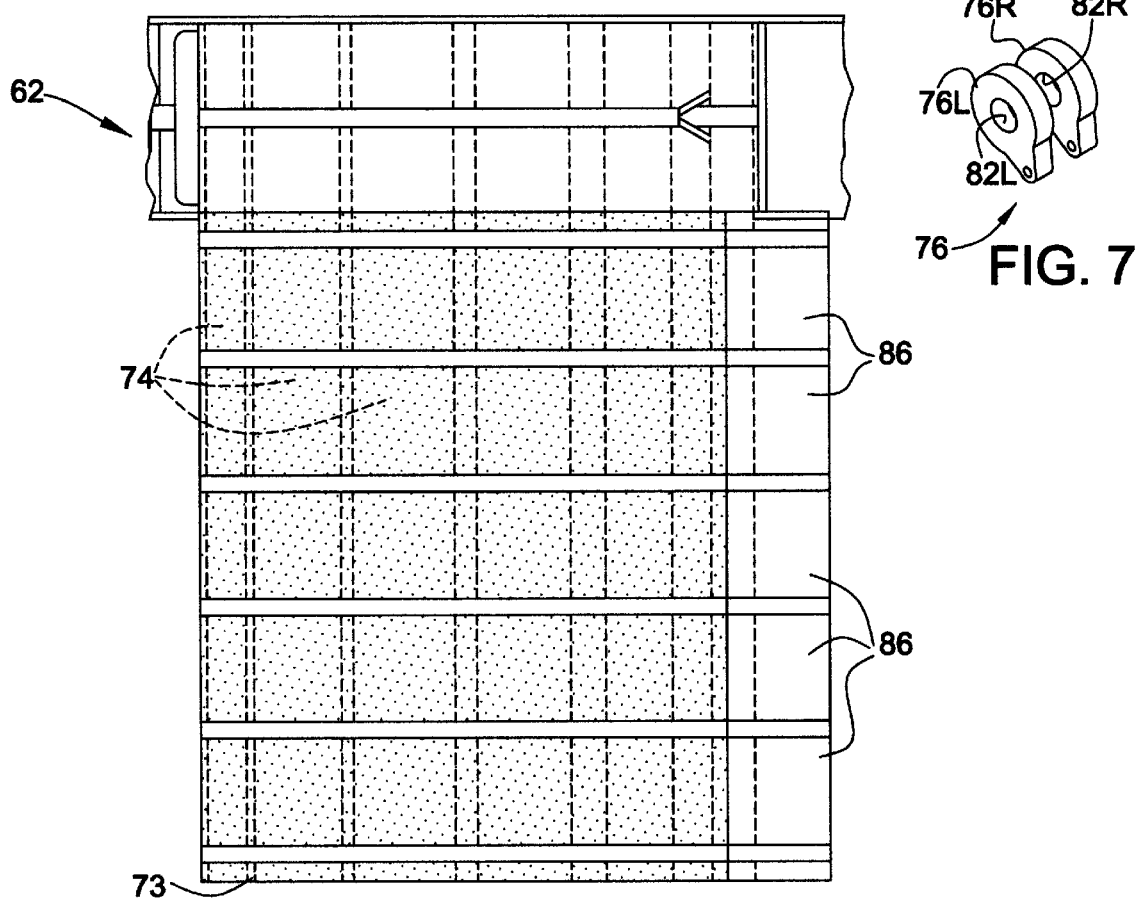
FIG. 6A
FIG. 7
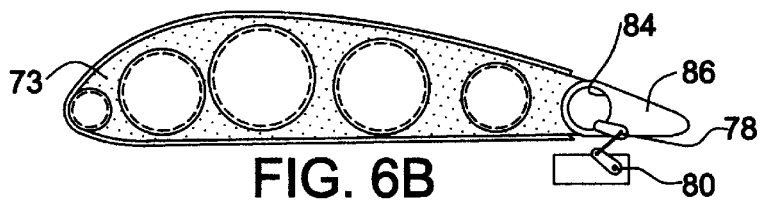
FIG. 6B

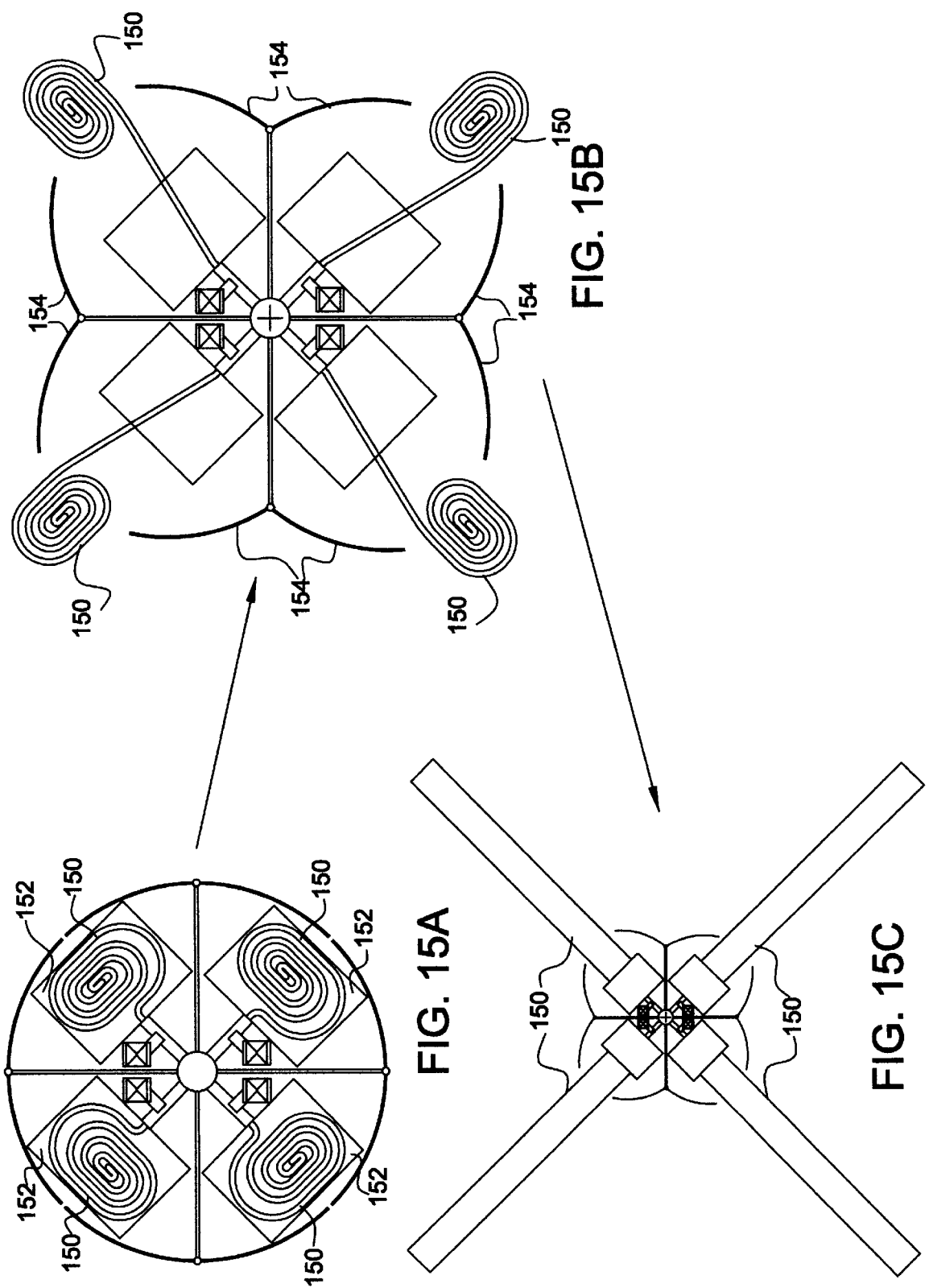

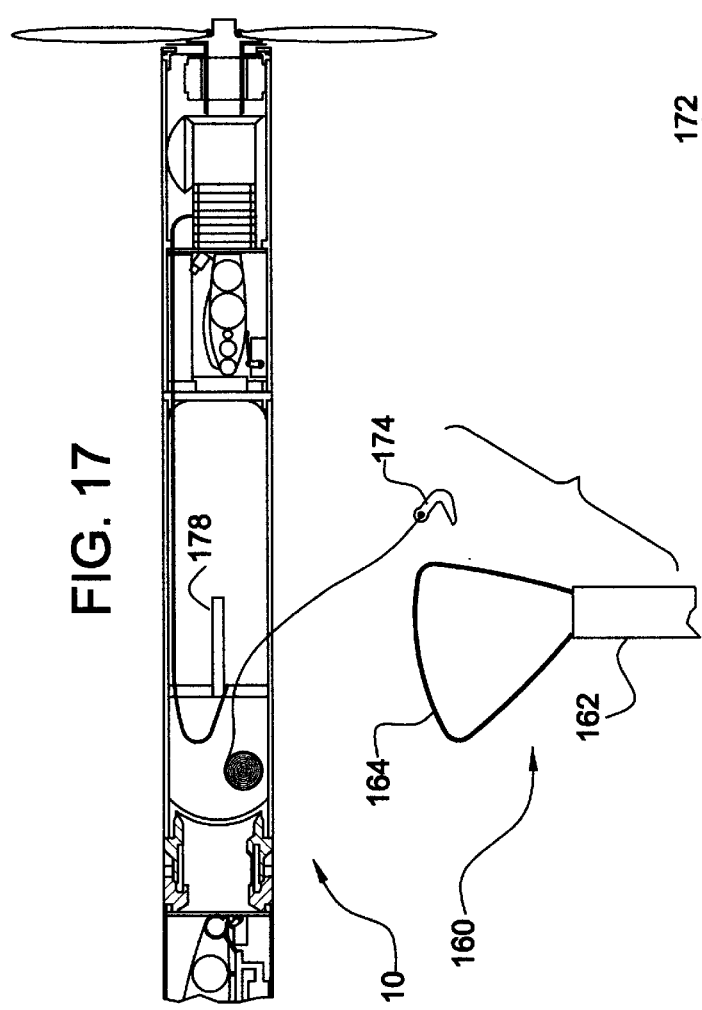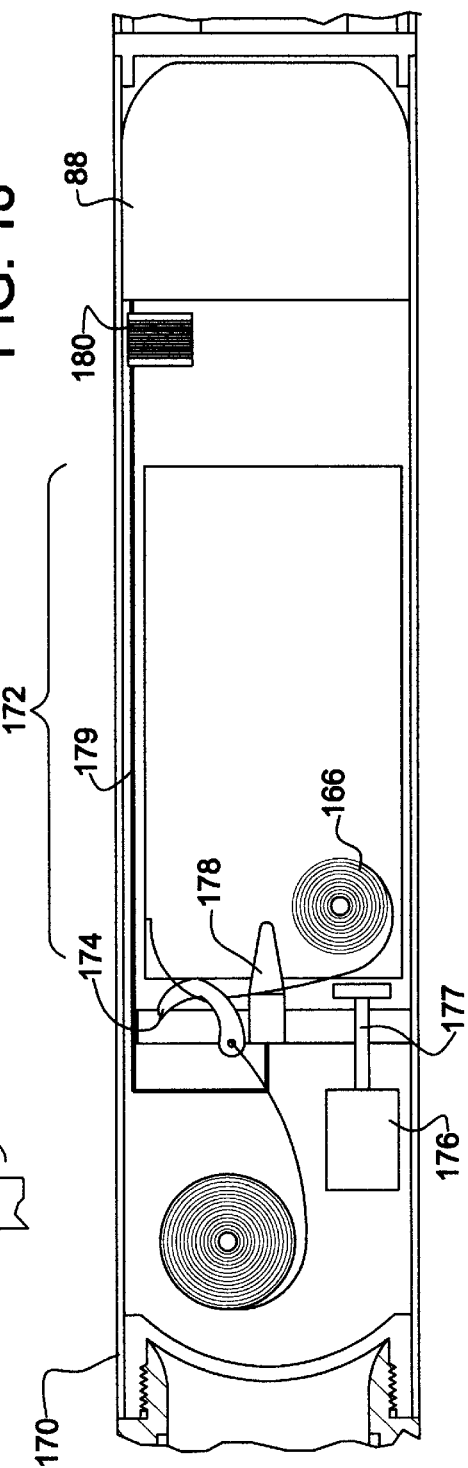

TRANSFORMABLE GUN LAUNCHED AERO VEHICLE

The priority benefit of the Jan. 13, 1998 filing date of application Ser. No. 60/071,006 is hereby claimed.

BACKGROUND OF THE INVENTION

1. Field of the Invention

The present invention relates to a gun launched aero-vehicle that is transformable from a ballistic projectile configuration to an aeroplane configuration. In particular, the invention relates to a vehicle that uses a cylinder strong back for both the shell of the projectile and the fuselage of the aeroplane.

2. Description of Related Art

Prior art unmanned aero-vehicles are generally runway or catapult launched. Vehicles are known to be delivered in a projectile or shell that opens like a clam shell; however, such vehicles are either very small inside the clam shell or are fragile and cannot survive the acceleration of a large gun launched projectile.

Once such a vehicle is delivered down range, such a vehicle has limited loiter time due to small fuel tank capacity.

SUMMARY OF THE INVENTION

It is an object of the present invention to provide a long range rapidly deployable aero vehicle. It is another object to provide a gun launch vehicle that is transformed into an aero vehicle from a projectile shell.

These and other objects are achieved in a transformable gun launched aero vehicle that has a ballistic projectile configuration and an aeroplane configuration and includes a cylinder forming a shell of the vehicle in the ballistic projectile configuration and fuselage of the vehicle in the aeroplane configuration. The vehicle further includes inflatable wings or unfoldable wings and tail section that are deployable from the cylinder, an engine, a propeller and a control system. The inflatable wings include plural rib elements with plural apertures disposed therethrough, plural inflatable tubes transverse to the rib elements, each tube being disposed in and through a corresponding aperture of each rib element, and a wind shell disposed around the plural inflatable tubes and the plural rib elements. The control system determines when the vehicle has reached a first predetermined state defining where to initiate a transition from the ballistic projectile configuration to the aeroplane configuration. Upon initiation of the transition, a parachute is deployed from an aft portion of the cylinder after the vehicle has reached the first predetermined state. The control system then deploys the wings after the parachute is deployed, detaches the parachute after the wings are deployed, deploys the propeller after the parachute is detached, and operates the engine after the parachute is detached and the propeller is deployed. The vehicle also includes a parachute that is reversibly deployable from a nose portion of the vehicle while the vehicle is in the aeroplane configuration, at least one landing rod that is reversibly extendable from the vehicle, and a landing controller. The landing rod includes a landing rod end and a reversibly inflatable foot. The landing controller extends a landing rod after the parachute has been deployed and the vehicle has begun to vertically descend and inflates the foot after the landing rod is extended to a landing length. The landing controller also rapidly extends the rods to a launch length greater than the landing length to impart sufficient vertical velocity to the vehicle to launch the vehicle. Once launched, the landing controller retracts the foot and landing rods, and operates the engine to drive the propeller.

BRIEF DESCRIPTION OF DRAWINGS

The invention will be described in detail in the following description of preferred embodiments with reference to the following figures wherein:

FIG. 4A is a section view of a forward portion of the vehicle of the present invention;

FIG. 4B is a section view of an aft portion of the vehicle of the present invention;

FIG. 5 is a section view of a centerline of the vehicle of the present invention at the location of an inflateable wing;

FIG. 6A and 6B are plan and section views of the inflateable wing and a section view, respectively;

FIG. 7 is a perspective view of an aileron rotation sleeve of the wing control mechanism of the vehicle of the present invention;

FIG. 15A is a top view of a landing foot of the vehicle while the foot is in a stowed position;

FIG. 15B a top view of the landing foot of the vehicle while the foot is deploying;

FIG. 15C is a top view of the landing foot of the vehicle after the foot is deployed;

FIG. 17 is a schematic view of the vehicle refueling system showing the aero-vehicle with hook extended and the fuel bladder system; and FIG. 18 is a section view of a centerline of the vehicle of the present invention at the location of the external fuel bladder stowage chamber.

DETAILED DESCRIPTION OF PREFERRED EMBODIMENTS

Figure 1:
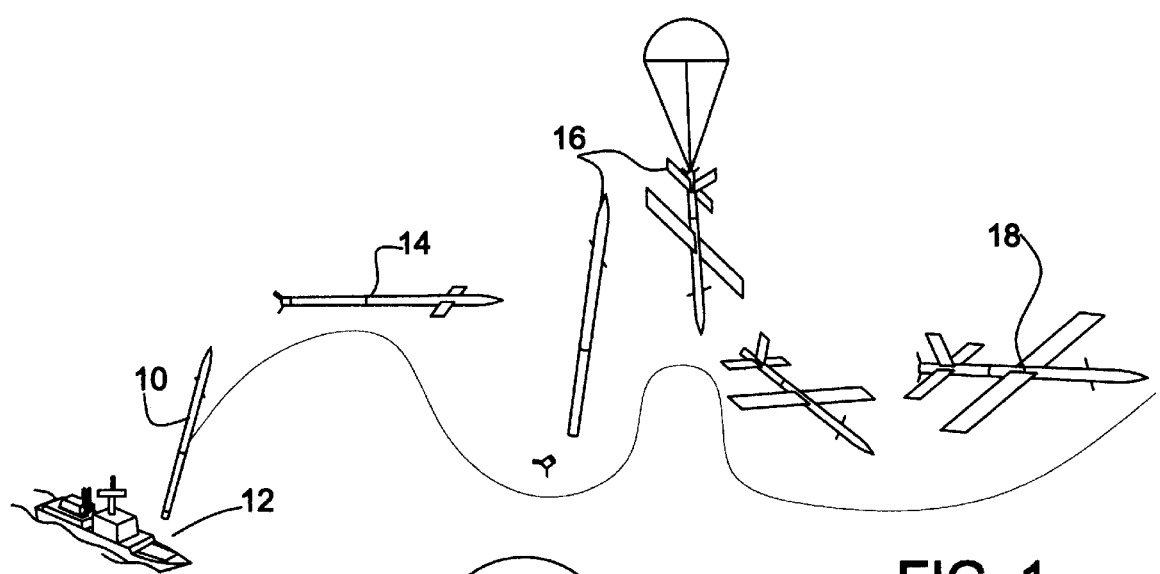
FIG. 1 is a view of a scenario time line of the present invention.

In FIG. 1, a scenario timeline of a flight of the present invention is depicted. Vehicle 10 is gun or tube launched in launch phase 12. Promptly after gun launch, fold out fins are deployed to stabilize flight. The gun is preferably a 5 inch gun such as used in the U.S. Navy, but guns from 60 mm to 155 mm and 8 inch such as used by the U.S. Army and other military services can be used as well. Alternatively, vehicle 10 (FIG. 1) can be launched from a mortar system or from simple high pressure tubes using cold or hot gas generators. Gun, mortar or tube launch has several advantages over prior art which utilizes runway takeoff or missile boost to flight speeds. A gun charge or a gas generator is less expensive than a rocket booster. Guns, mortars, and tubes are highly mobile and can launch quantities of vehicles required in a battle, civilian emergency, police action and other situations. Gun, mortar or tube launch of vehicle 10 offers many other advantages over the prior art, including, but not limited to, faster response, more vehicle launches, flexibility of launch site, lower infrastructure costs, elimination of rocket infrared signatures and rocket launch hazards, elimination of need for airport runways, all weather operation, and very high wind operation. However, gun launch subjects the vehicle to much higher accelerations than the prior art.

After launch phase 12 (FIG. 1), the vehicle enters a high speed phase (in the subsonic to supersonic regime) denoted flight phase 14, where fold out canards are deployed to extend flight range via aerodynamic glide. As a gun launched vehicle, vehicle 10 will typically fly form a few hundred meters to 50 nmi ballistically before impacting, preferably in the 1 to 10 nmi range.

However, vehicle 10 transitions from ballistic projectile configuration to aeroplane configuration in transition phase 16. Thereafter, vehicle 10 flies as an aerodrone under propeller power driven by an air breathing engine in cruise phase 18. In the cruise phase, vehicle 10 can extend its range from the initial launch to 100 nm or more.

To survive the launch phase, vehicle 10 is made of a metal or synthetic composite cylinder that is retained as an aerodrone fuselage after transition phase 16. The metal or synthetic composite cylinder serves as the projectile shell during the launch and supersonic flight phases. After transition phase 16, the metal or synthetic composite cylinder phase serves as the aerodrone fuselage. In contrast, known aerodrone carrying projectiles use unfoldable structures for the aerodrone fuselage that are carried inside the projectile shell as a payload. Such structures are delicate and must be specially packed to ensure proper deployment after launch accelerations.

In addition, the metal or synthetic composite cylinder serves as an outer wall of the aerodrone's fuel tank. The fuel tank is bounded by the cylinder and two bullhead walls. In contrast, known aerodrone carrying projectiles carry a separate fuel tank for the aerodrone inside the projectile shell. To survive launch accelerations, both the fuel tank and the projectile shell of known aerodrone carrying projectiles must be of suitable thickness which limits the fuel capacity by limiting the cross-sectional area of the inside of the fuel tank. In the present invention, by forming part of the fuel tank from the cylinder of vehicle 10, it is possible to carry more fuel and extend the aerodrone's range for any given size gun.

Figure 2:
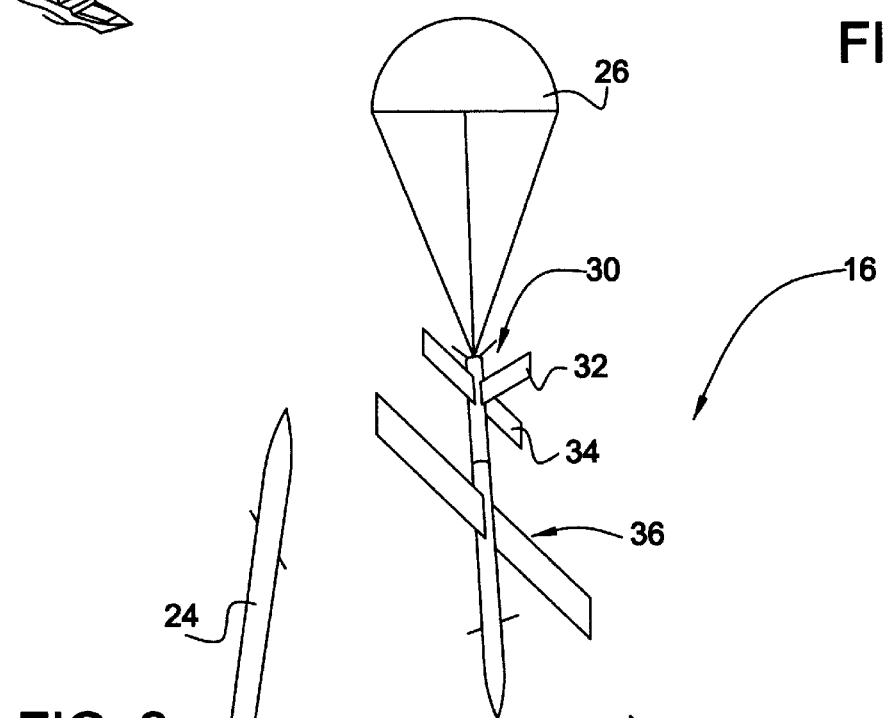
FIG. 2 is a view of the transition phase between a ballistic projectile configuration and an aeroplane configuration of the present invention.

As supersonic flight phase 14 proceeds, an angle of attack of the canards of vehicle 10 is increased as the velocity slows. At a predetermined point, transition phase 16 is initiated. In FIG. 2, the canards lift the vehicle's attitude into or toward a stall causing the vehicle's velocity to decelerate (preferably to a zero airspeed), and tail fins 22 are discarded. Drogue chute 26 is deployed, and while the vehicle is descending, the aerodrone's wings 36, elevators 34, horizontal stabilizer 32 with rudder and propeller 30 are deployed. Deployable wings 36, elevators 34, and horizontal stabilizer 32 are preferably inflatable parts; however, such parts may alternatively unfold from a folded configuration. The aerodrone's air breathing engine (preferably about 8 horsepower) is started, and when sufficient power is developed, drogue chute 26 is discarded. Aerodrone 38 dives to develop sufficient airspeed to sustain level flight (preferably about 80 knots), and then it transitions into cruise phase 18 (FIG. 1).

It will be appreciated that some altitude loss may be expected during transition phase 16. The predetermined point at which transition phase 16 is initiated should be selected so that the altitude loss during transition phase 16 does not leave the aerodrone too close to the local ground. The velocity of vehicle 10 should be high enough so that the canards have enough lift to effect the desired vehicle attitude. The vehicle need only be slowed and need not be placed into a complete stall. In an alternative embodiment, if the vehicle has enough altitude, vehicle 10 includes a suitable autopilot (preferably employing neural network processing) that controls transition phase 16 without the use of drogue chute 26.

Figure 3A:
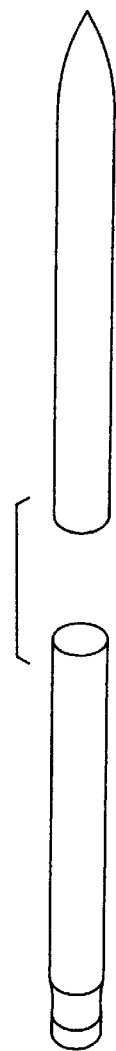
FIG. 3A is a view of the present invention as two component parts in a pre-launch phase.

In FIG. 3A, vehicle 10 is assembled from two component parts. Forward component part 42 includes mission payloads and the deployable wing. The mission payloads includes such parts as the fold out canards, guidance/navigation computer, autopilot, aero-flight sensors, mission dependent sensors (as needed), bombs or other payloads (as needed). Aft component part 44 includes fold out fins, an air breathing fuel burning engine, a fuel tank, a deployable propeller, a deployable tail structure (elevators 36 and horizontal stabilizer 32). The forward and aft components parts 42, 44 are locked together at a locking ring. This two part structure permits vehicle 10 to be easily configured in the field for any mission by combining a forward part 42 (of many pre-planned forward parts 42) with an aft part 44. In light of these teaching, persons skilled in this art will appreciate that the vehicle could be configured alternatively to achieve a tube or gun launched transformable vehicle.

Figure 3B:
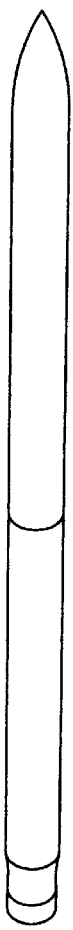
FIG. 3B is a view of the present invention in the ballistic projectile configuration in a launch phase.
Figure 3C:
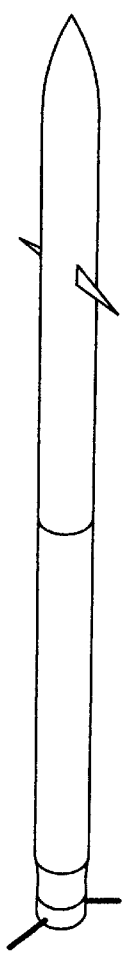
FIG. 3C is a view of the present invention in the ballistic projectile configuration in a supersonic flight phase.
Figure 3D:
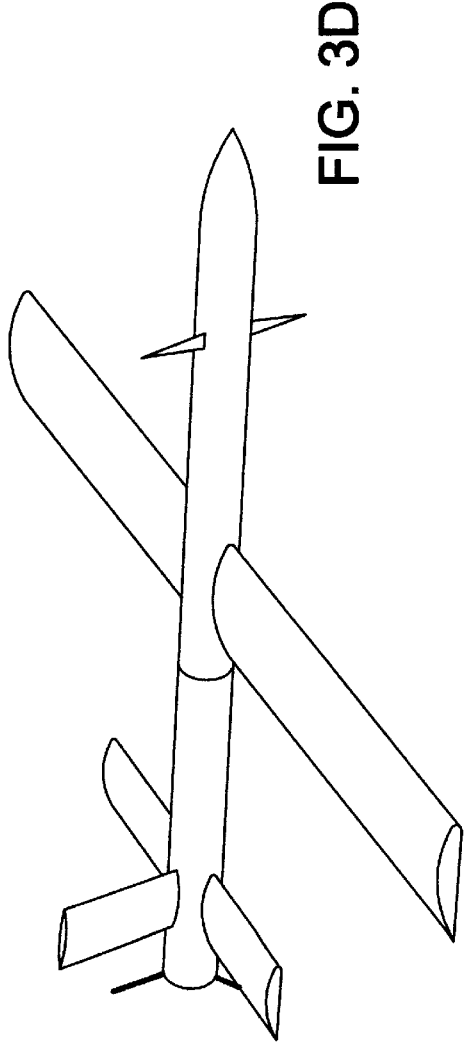
FIG. 3D is a view of the present invention in an aeroplane configuration in a cruise or loiter phase.

FIG. 3B depicts vehicle 10 ready for loading in the launching gun. In a preferred configuration for launch from a Navy 5 inch gun, vehicle 10 is 111 inches long by 5 inches in diameter. FIG. 3C depicts vehicle 10 in supersonic flight configuration with the fold out fins and canards deployed. FIG. 3D depicts vehicle 10 configured as the aerodrone in cruise configuration.

In FIG. 1, a transformable gun launched aero vehicle has a ballistic projectile configuration 14 and aeroplane configuration 18. Preferably, the structural integrity of the vehicle relies on a cylinder that forms a shell of the vehicle in the ballistic projectile configuration and forms a fuselage of the vehicle in the aeroplane configuration. The cylindrical shape survives well the acceleration of gun launch when the vehicle is in the ballistic projectile configuration, and survives well the decelerations encountered when retrieving a preplaced fuel bladder or other payload when the vehicle is in the aeroplane configuration. The cylindrical shape also provides advantages for low cost manufacturing.

In PIGS. 4A and 4B, the vehicle is preferably formed of a forward part 42 and an aft part 44. The cylinder includes a forward cylinder part and an aft cylinder part joined at docking joint 50. Docking joint 50 includes a rotation mechanism to rotate the forward cylinder part relative to the aft cylinder part. Preferably, the vehicle is assembled from one of several available mission dependant forward parts 42 with one of several available mission dependant aft parts 44. The docking joint provides a "soft dock" of the two parts as the vehicle is loaded in the launching gun's bore. Behind aft part 44, a cartridge or charge is loaded in the gun's bore. Aft part 44 makes a tight seal with the gun's bore for efficient gun launch operation; however, forward part 42 is preferably loosely fitted in the gun's bore so that forward part 42 is free to rotate. The rotation mechanism of docking joint 50 includes a spring powered rotation drive to rotate the forward cylinder part relative to the aft cylinder part until a detent signals rotational alignment between the forward cylinder part with the aft cylinder part. The docking joint maintains alignment between the forward cylinder part and the aft cylinder part during gun launch compression (acceleration) and during rebound tension. It will be appreciated that forward part 42 and aft part 44 are longitudinally compressible. These parts compress under acceleration during gun launch and rebound shortly after when the launch acceleration ceases. The docking joint forms a "hard dock" during gun launch so as to hold the forward and aft parts together against the inevitable rebound tension.

Figure 11:
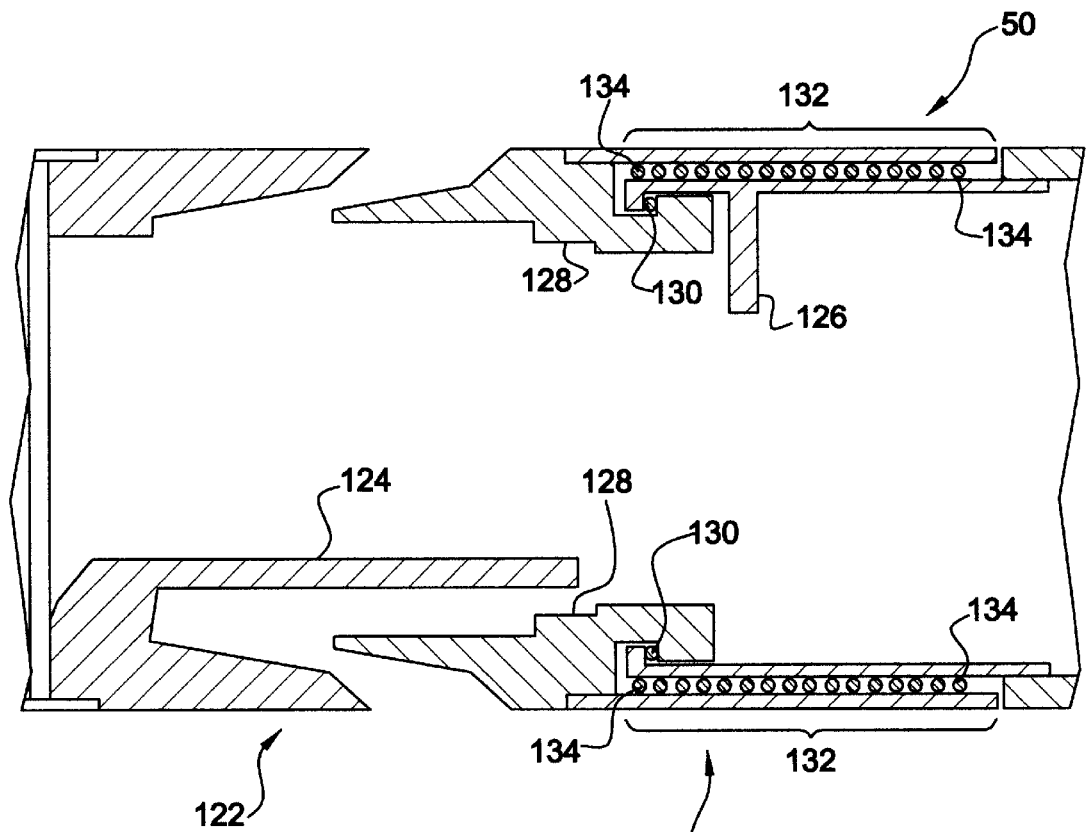
FIG. 11 is a section view of a centerline of the vehicle of the present invention at the location of the docking joint showing an undocked state.
Figure 12:
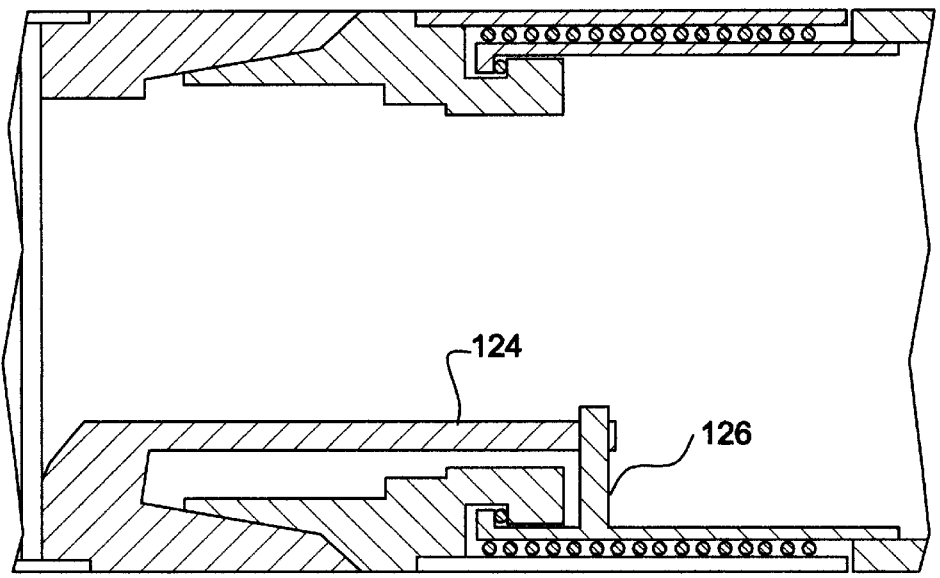
FIG. 12 is a section view of a centerline of the vehicle of the present invention at the location of the docking joint showing a docked state.

In FIG. 11, docking joint 50 includes forward joint part 120 and aft joint part 122. Aft joint part 122 includes alignment prong 124, and forward joint part 120 includes alignment stop 126. Forward and aft joint parts 120, 122 form a strong press fit. Forward joint part 120 has aft section 128 and forward section 132 joined at bearing 130. Bearing 130 provides forward section 132 with free rotation relative to af section 128, but restrains pull apart rebound tensile loads that may be experienced at launch tube exit. Coil spring 134 provides torque between forward section 132 and aft section 128. In 10 operation, the coil spring is stressed by "winding it up" when forward part 42 and aft part 44 (FIGS. 4A and 4B) are "soft docked" and loaded into the gun or other tube. Subsequently, the forward part will freely rotate until rotation is stopped when the alignment prong contacts the alignment stop at a detent as depicted in FIG. 12.

In FIG. 4A, forward part 42 includes guidance and control section 52, cameras 54, folding canard section 56, payload section 58 and wing section 60. Guidance and control section 52 may advantageously include modules to perform additional control functions such as autopilot control, fuel management, electrical power management and general mission management. Typically, guidance and control section 52 will include software and data stored in a memory and a processor and necessary input/output interfaces. Cameras 54 and payload section 58 represent mission dependant elements and may be replaced with other elements as needed by a particular mission. Mission payload section 58 may hold, for example, bomblets for deployment over hostile regions or radio communication equipment for relay operations. Food, medicine or other supplies for battle or emergency situations may be delivered this way. Wing section 60 includes wings that are either unfoldable or, preferably are inflatable.

In FIG. 5, wing section 60 includes rib element backbone 62 that has plural apertures 64 disposed therethrough. Rib element backbone 62 is preferably made from metal or high strength composites and fixedly attached to a centerline within forward part 42. One or more inflation mechanisms 66 are coupled through manifold 68 to deliver gas (e.g., air, helium, etc.) to the centers of rib element backbone 62. Inflation mechanism 66 may be an air pump and/or a compressed air canister (or other gas canister) or a gas generator coupled to manifold 68 through electrical valves. Then, on command, gas is transferred from the gas canister through manifold 68 into apertures 64.

In FIGS. 6A and 6B, portion 70 of an inflated wing section includes rib elements 72 and plural inflatable tubes 74. Rib elements 72 may be formed of any light weight structurally rigid material, and tubes 74 are preferably formed from a high pressure inflatable fabric. Spaces in the wing between the tubes are preferably filled with lightweight crushable foam filler material 73. Distal ends of tubes 74 are closed, and proximal ends of tubes 74 are tightly sealed to rib element backbone 62 (FIG. 5). When both left and right wings are so attached, gas from inflation mechanism 66 passes through manifold 68 into aperture 64 (see FIG. 5), and since tubes 74 (FIGS. 6A and 6B) are closed at their distal ends, the tubes inflate to a sufficiently high pressure that the tubes become stiff. Tubes 74 inflate and become stiff at an angle transverse to rib element backbone 62 so as to establish a desired dihedral angle between left and right wings for a desired stability in aerodynamic flight. A wind shell of suitable fabric (not shown) is disposed around the plural inflatable tubes and the plural rib elements to give the wing a suitable aerodynamic shape.

When inflated, the wings have a wing span suitable for the mission. However, before the wings are inflated, the rib elements are disposed adjacent to each other, each tube being accordion pleat folded into corresponding apertures in the plural rib elements so that the uninflated wing is stowed within the format of the cylinder. Then, when the wings are to be deployed, a wing section cover (i.e., a portion of the wall of the cylinder that is over the uninflated wing) is jettisoned, and each inflatable tube is inflated so that the tube becomes substantially rigid. The plural rib elements are spaced apart at predetermined stations along the inflated tubes so that the wing is extended.

Each wing of the vehicle includes an articulateable aileron. In FIG. 5, left and right rotation sleeves 76L, 76R (shown collectively as 76) are disposed in the aft most aperture 64 of rib element backbone 62. Rotation sleeves 76L, 76R includes control tabs 78L, 78R (shown collectively as 78) linked to aileron control mechanism 80. Aileron control mechanism 80 operates to independently rotate left and right sleeves 76L, 76R within aft most aperture 64. Manifold 68 delivers gas under pressure to an inner surface of aft most aperture 64 and to a space between left and right sleeves 76L, 76R. In FIG. 7, the space between let and right sleeves 76L and 76R receives gas under pressure from the inner surface of the aft most aperture 64 and communicates this gas through center 82L, 82R of sleeves 76L, 76R. Seals (not shown) may be advantageously provided to improve the tightness of the fit and minimize gas leakage as inflation mechanism 66 provides gas under pressure to centers 82L, 82R of sleeves 76L, 82R. Other mechanisms that provide gas under pressure to the center of a rotatably sleeve may be equivalent.

In FIGS. 6A and 6B, left and right inflatable aileron tubes 84 are attached at their proximal ends to outboard sides of rotation sleeves 76L, 76R. When the wing is inflated, left and right aileron tubes 84 are also inflated. The aft most apertures through the rib elements 72 include a slip sleeve in which aileron tubes 84 freely rotates when respective rotation sleeves 76L, 76R rotate. Aileron rib elements 86 are fixedly attached to aileron tubes 84 so that as an aileron tube 84 is rotated, aileron rib elements 86 also rotate. The wind shell of suitable fabric is also disposed around the aileron inflatable tubes and the plural aileron rib elements to give the wing a suitable aerodynamic shape that is controllable. Aileron control mechanism 80 is controlled by flight controls such as an autopilot or the computer in the guidance and control section.

In FIG. 4B, aft part 44 of the vehicle includes fuel tank 88, deployable tail section 90, engine 92, folding propeller 94, and folding tail fins 96. Deployable tail section 90 may be unfoldable but is preferably inflatable and includes an inflatable and articulateable elevator and an inflatable and articulateable rudder. The inflatable tail section is inflated when the vehicle transitions into the aeroplane configuration.

Figure 8:
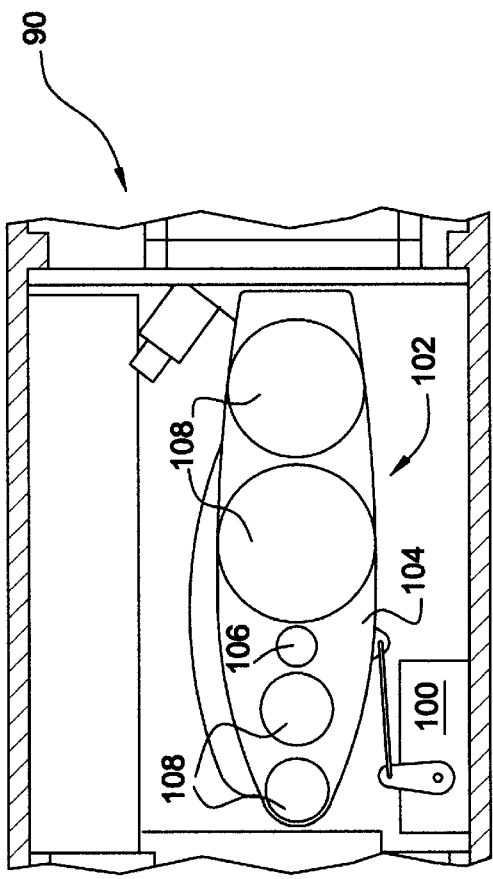
FIG. 8 is a section view of a centerline of the vehicle of the present invention at the location of an inflateable tail section.

In FIG. 8, inflatable tail section 90 includes elevator control mechanism 100 and inflatable elevator 102. Inflatable elevator 102 includes rib element backbone 104 (like wing rib element backbone 62) pivotally attached to the vehicle frame at pivot 106. Inflatable elevator 102 is linked to elevator control mechanism 100 so that the angle of attack can be controlled. Inflation mechanism 66 (FIG. 5) or another inflation mechanism is coupled through a suitable manifold to provide gas under pressure to the inside of apertures 108 of elevator rib element backbone 104. The suitable manifold includes any known means to provide the gas to apertures 108 while elevator 102 is pivoting.

Like the inflatable wings, inflatable elevator 102 includes rib elements formed from a light weight structurally rigid material and plural inflatable tubes formed from a high pressure inflatable fabric. Distal ends of the inflatable tubes are closed, and proximal ends of the tubes are tightly sealed to elevator rib element backbone 104. When both left and right inflatable tubes are so attached, gas from the inflation mechanism passes into aperture 108, and since the inflatable tubes are closed at their distal ends, the tubes inflate to a sufficiently high pressure that the tubes become stiff. Like the inflatable wing, a wind shell of suitable fabric is disposed around the plural inflatable tubes and the rib elements to give inflatable elevator 102 a suitable aerodynamic shape.

Before the elevator is inflated, the rib elements are disposed adjacent to each other and adjacent to elevator rib element backbone 104, each tube being accordion pleat folded into corresponding apertures in the rib elements so that the uninflated elevator is stowed within the format of the cylinder. When the elevator is to be deployed, a tail section cover (i.e., a portion of the wall of the cylinder that is over the uninflated tail section) is jettisoned, and each inflatable tube is inflated so that the tube becomes substantially rigid. The rib elements are spaced apart at predetermined stations along the inflated tubes so that the elevator is extended when deployed.

The inflatable rudder is made and operated much like inflatable elevator 102. Elevator control mechanism 100 and a rudder control mechanism (not shown) are controlled by flight controls such as an autopilot or the computer in the guidance and control section.

Figure 9:
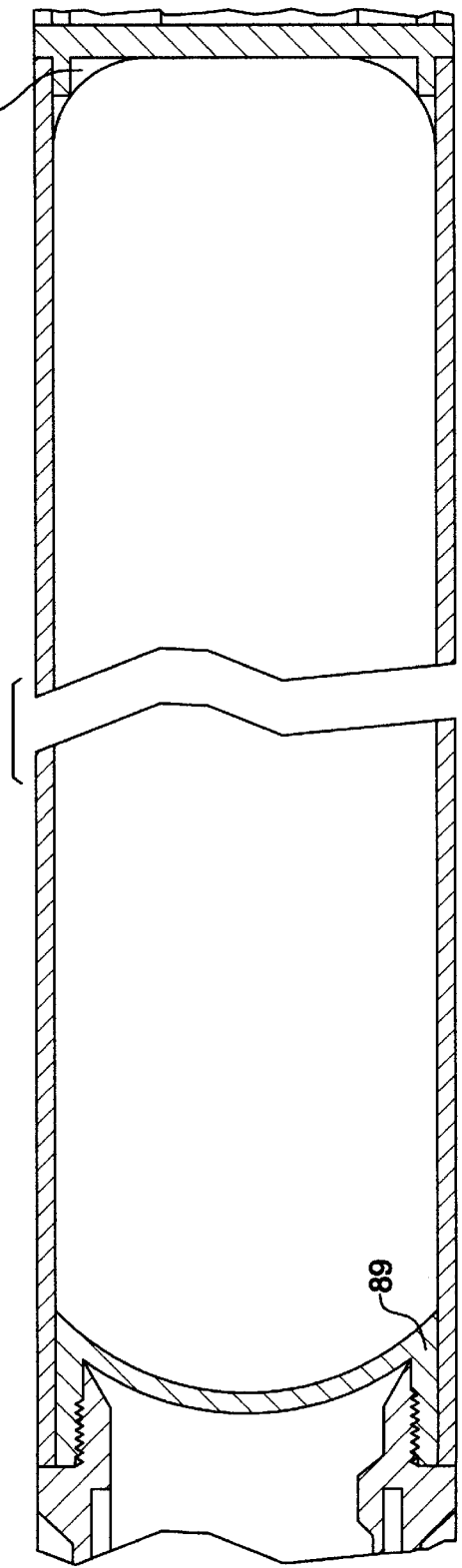
FIG. 9 is a section view of a centerline of the vehicle of the present invention at the location of an internal fuel tank.

In FIGS. 4B and 9, internal fuel tank 88 is formed within the cylinder by two spaced apart bulkhead walls 89 sealed to an inside surface of the cylinder. The fuselage wall (i.e., the cylinder) serves as the fuel tank structural wall. Since the cylinder may be formed of various composite materials, the inside of the fuselage may be coated with a thin layer of fuel resistant material, if necessary. Preferably, the fuel tank includes a displacement bladder, and the vehicle includes a pump mechanism to force fuel from the displacement bladder.

Figure 13:
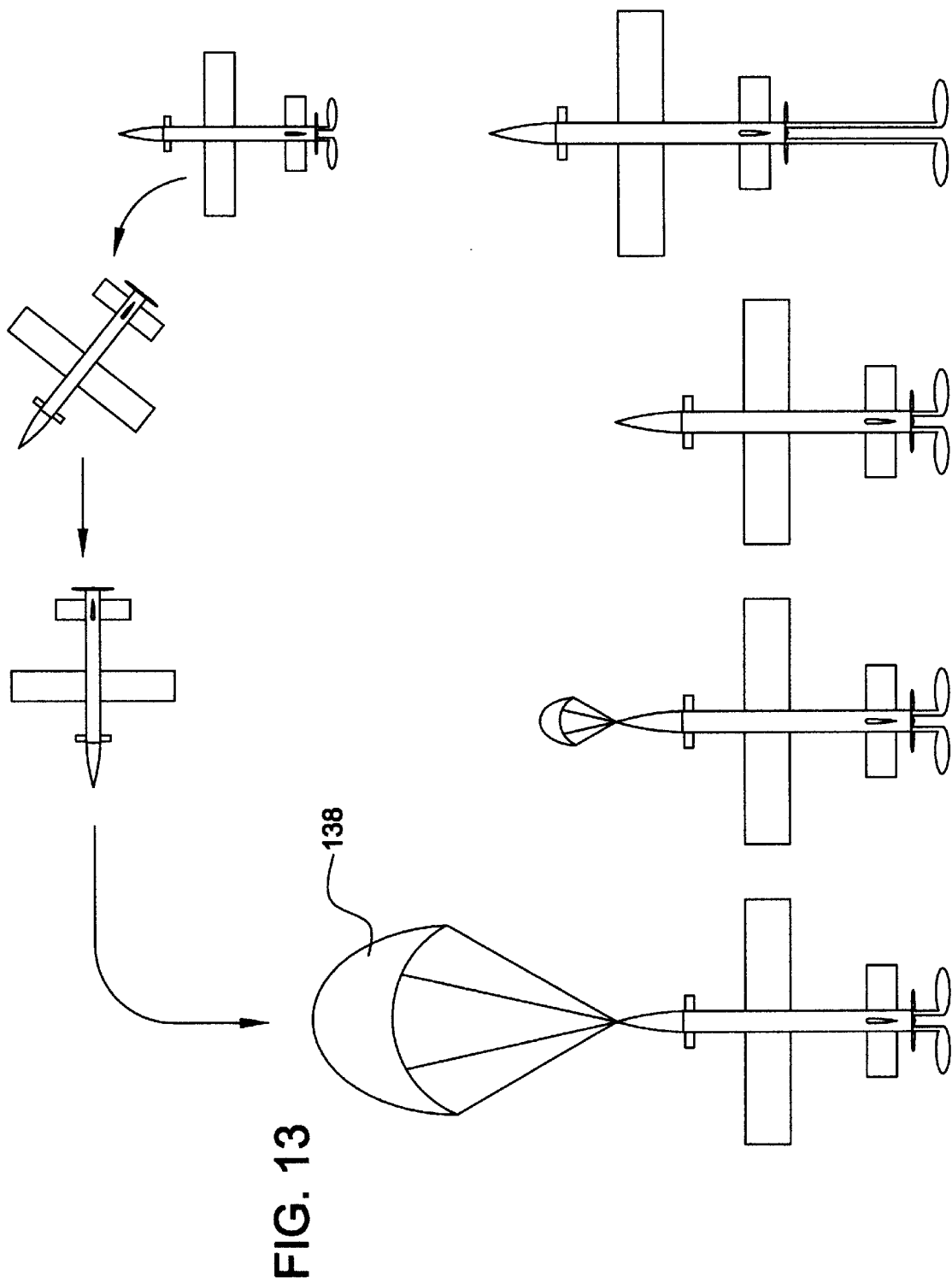
FIG. 13 is a scenario view of the repeatable vertical takeoff and landing cycle of the present invention.

In FIG. 13, the vehicle includes parachute 138 that is reversibly deployable from a nose portion of the vehicle while the vehicle is in the aeroplane configuration. When parachute 138 is deployed, the engine is stopped, the propeller is locked into a predetermined rotational angle to make clearance for landing rods (see FIG. 14B), and the vehicle begins to descend to a vertical landing.

Figure 14A:
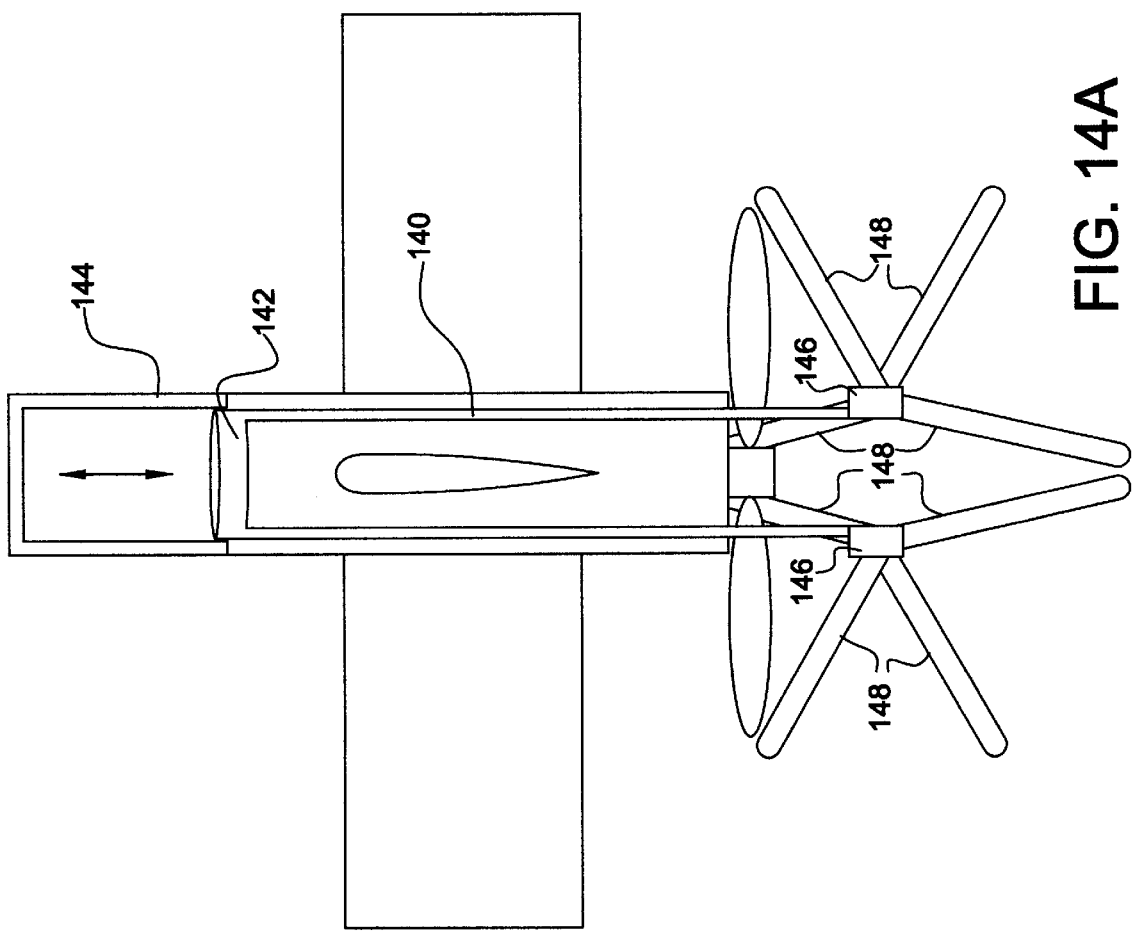
FIG. 14A is a schematic view of the vehicle in a vertical landing configuration.
Figure 14B:
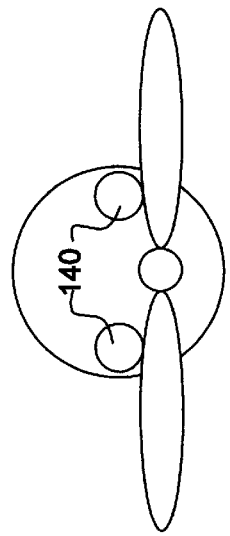
FIG. 14B is an aft view of the landing rods and propeller of the vehicle.

The vehicle further includes at least one landing rod, preferably 2, 3 or 4 landing rods. Each landing rod is reversibly extendable from the vehicle. The vehicle further includes a landing controller which may be part of the computer in the navigation and guidance section. The landing controller controls the landing rods to extend to a landing length after parachute 138 has been deployed and the vehicle has begun to vertically descend. In FIG. 14A, landing rods 140 are pushed by piston 142 that is driven by high pressure chamber 144. Each landing rod includes landing rod end 146 and reversibly inflatable foot 148. The landing controller controls each foot 148 to inflate from landing rod end 146 after the landing rods are extended to the landing length. When inflated, each foot 148 includes plural "toes" as depicted in FIG. 14A. The toes are made of an elastomeric inflatable fabric similar to or the same as the inflatable fabric used in the inflatable wing and tail section.

In FIGS. 15B and 15C, each toe 150 of foot 148 housed in landing rod end 146 is initially rolled up due to a coiling force imparted by coiling spring 152 or by the elastomeric nature of the inflatable tube material. High pressure air is pumped from an engine driven pump through a landing rod manifold to cause tube "toes" to swell and unroll forcing clams hell doors to open and produce a straight tube configuration. When foot 148 is inflated, spring action clams hell doors 154 are forced open as toes 150 extend. When fully inflated (preferably in about 10 seconds), toes 150 are stiff and form a stable foot as depicted in FIG. 15C. As an alternative to an engine drive pump, a gas generator or canister in the vehicle may provide gas under pressure through a hole in the center of landing rods 140.

All toes of the landing feet are inflated by the time the vehicle floats to the ground tethered under parachute 138. Then, the retractable parachute is retracted into the nose portion of the vehicle (see FIG. 13).

At a desired time, the vehicle takes off again. High pressure chamber 144 (FIG. 14A) is used as a drive mechanism to relaunch the vehicle. The landing controller controls the drive mechanism to rapidly extend all landing rods to a launch length greater than the landing length. This rapid extension imparts sufficient vertical velocity to the vehicle to launch the vehicle to be airborne.

Figure 16:
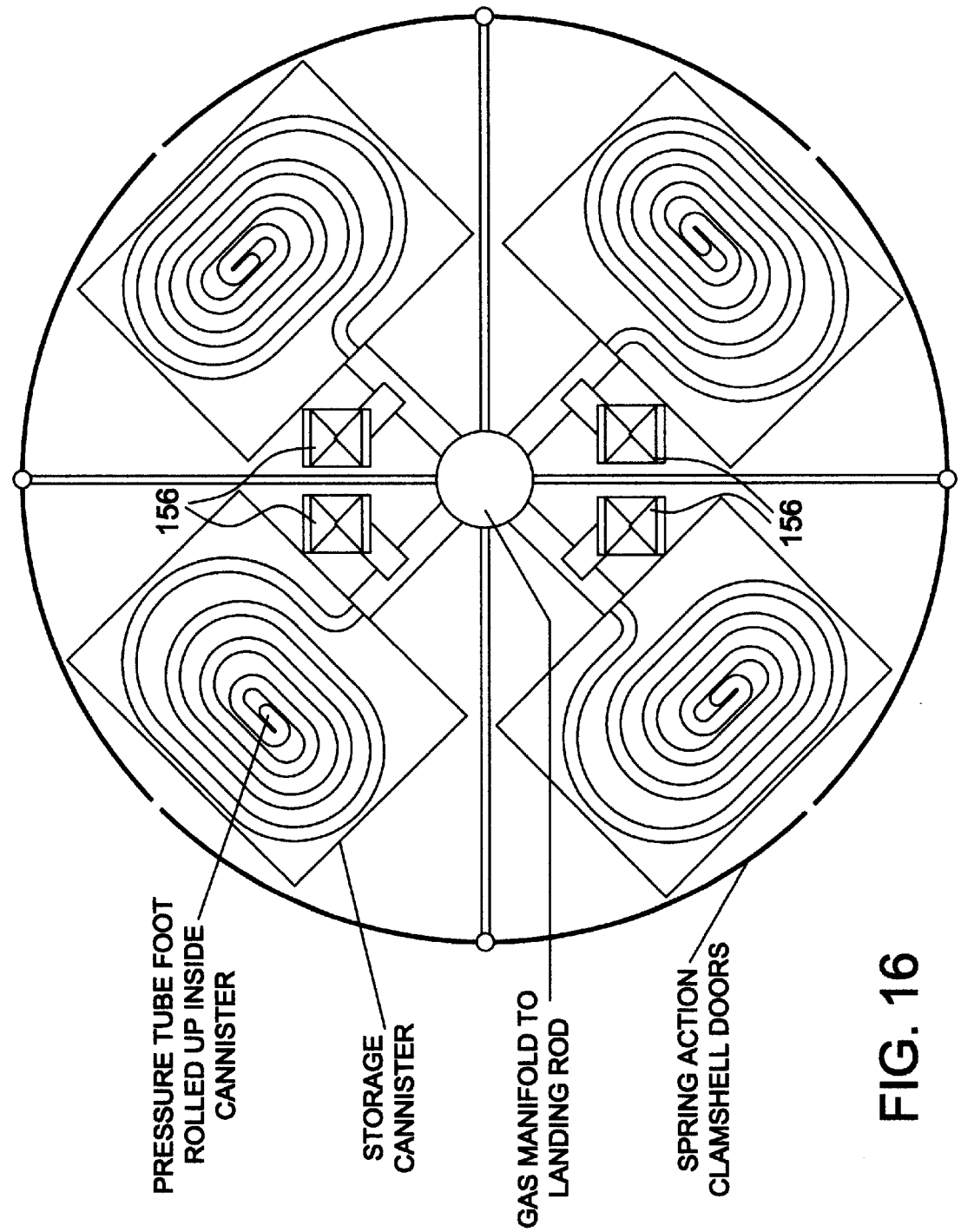
FIG. 16 is a top view of the landing foot showing quick release pressure vents.

In FIG. 16, the landing rod ends 146 include a quick release pressure vent 156 for each toe 150. As soon as the vehicle is airborne, all quick release pressure vents 156, vent gas out of toes 150, toes 150 coil up under influence of a coiling force provided by coil 152, and toes 150 retract into landing rod ends 146 as clams hell doors 154 close the toes into the landing rod ends. The vents and coil springs are sized to vent the toes in 0.1 to 5 seconds, preferably in about one second.

As soon as coils 150 are retracted and clamshell doors are closed, landing rods are quickly retracted so that the propeller may be turned. Then, the landing controller operates the engine to drive the propeller, and the vehicle resumes normal flight.

Figure 10:
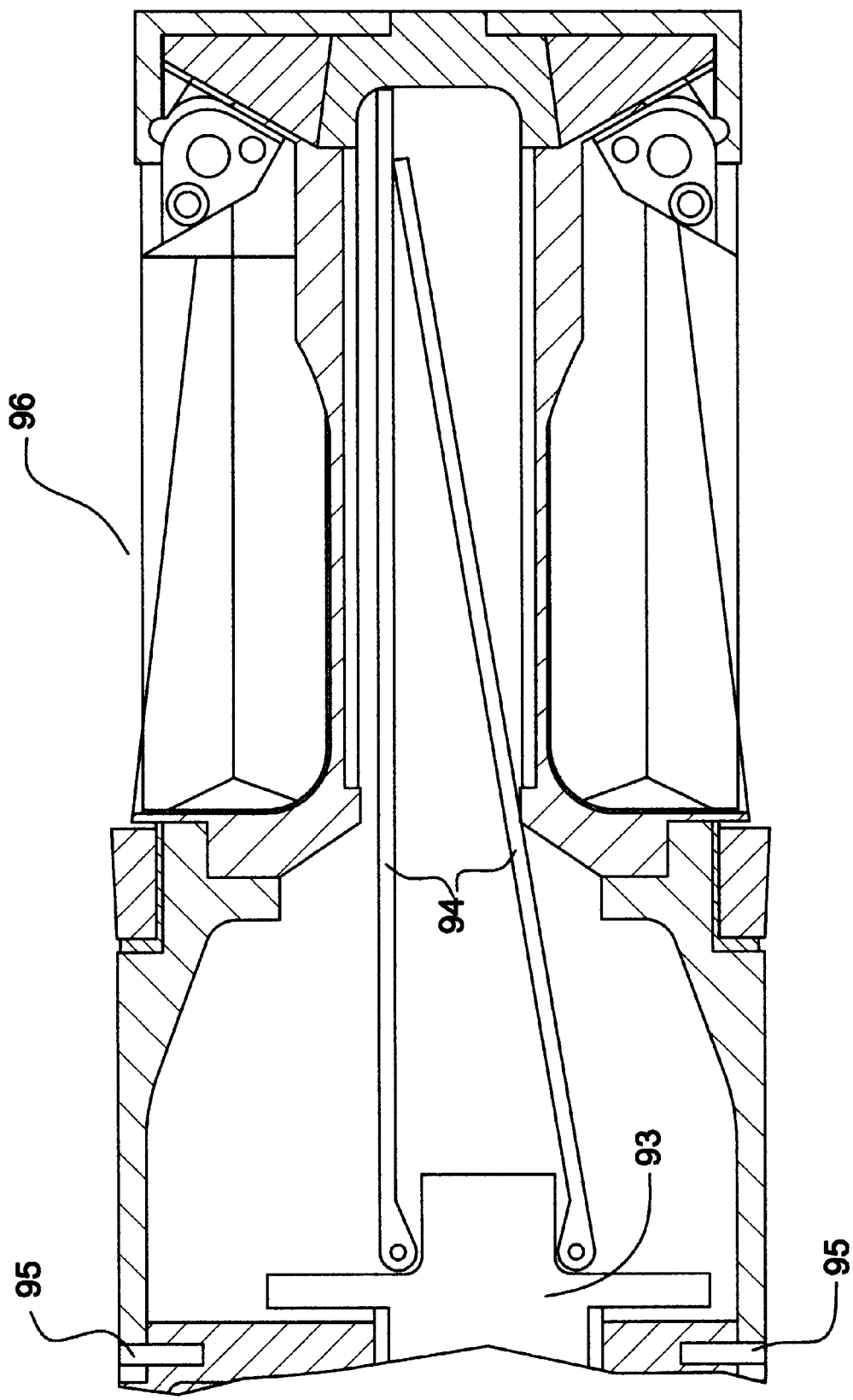
FIG. 10 is a section view of a centerline of the vehicle of the present invention at the location of the engine hub, deployable propellers and folding tail fins.

In FIG. 10, folding fin section 96 is attached to the main cylinder by, for example, exploding bolts 95. After parachute 26 (FIG. 2) is deployed during the transition from ballistic projectile configuration to aeroplane configuration, folding fin section 96 separates from the main portion of the vehicle. Propeller 94 is hingedly attached to engine hub 93 which is drivingly coupled to engine 92. When folding fin section 96 separates from the main portion of the vehicle, centrifugal force and/or springs force propeller 94 to unfold.

Preferably a flight control computer is the control system to control the transition phase. This computer may be a separate computer or a function of the guidance and control computer. The control system includes a module to determine when the vehicle has reached a first predetermined state, the first predetermined state defining a point of initiation of a transition from the ballistic projectile configuration to the aeroplane configuration. This module preferably includes an inertial navigation sensor to detect the initiation point based on speed, altitude, location, time from launch or a combination of these parameters. Alternatively, the module may include an air speed sensor, an altimeter (whether radar or barometric based), a radio navigation sensor (e.g., global positioning sensor, Loran, etc.), an optical system sensor (e.g., an infrared sensor to detect the vehicle's pitch angle by measuring the angle of the horizon line), a magnetic sensor, an electrostatic sensor (i.e., to detect a vertical electric field gradient and determine a vertical reference) and a timer to measure time from launch. Any combination of these sensors may also be employed.

The vehicle further includes parachute 26 (FIG.2) deployable from an aft portion of the cylinder, and the control system includes a module to deploy the parachute after the vehicle has reached the first predetermined state.

The control system further includes another module to deploy the tail section and the wings after the parachute is deployed.

The control system further includes a module to detach the parachute after the wings are deployed and to deploy the propeller after the parachute is detached. The control system operates the engine after the parachute is detached and the propeller is deployed.

Alternatively to the use of an aft parachute, the vehicle includes fold out articulateable canards, and the control system includes a module to articulate the canards so that a flight of the vehicle is altered to a second predetermined state after the vehicle has reached the first predetermined state. The vehicle canards are set to an increased angle of attack, the vehicle pitch increases and the vehicle slows into or almost into a stall. The flight control system controls the aircraft to avoid or recover from the stall.

The control system includes another module to deploy the propeller and inflate the wings and tail section after the vehicle has reached the second predetermined state (e.g., slow enough to permit wing inflation and at a high enough altitude to permit complete transition to the aeroplane configuration). The control system operates the engine when the propeller is deployed.

In an alternative embodiment, the vehicle includes a refueling mechanism since the vehicle's mission may be protracted. To refuel, the vehicle snares a fuel bladder system while in flight much as a small aircraft snares an advertising banner or a mail pouch. In FIG. 17, vehicle 10 snares fuel bladder system 160 while in flight. The high structural strength of the cylindrical fuselage enable vehicle 10 to pick up more weight, as a percentage of vehicle 10's weight, than can be picked up with known aerodrones. For an example, a 2000 pound aerdrone of the prior art can pick up only about 30 pounds since its fuselage cannot typically endure greater shock than 5 G's. In contrast, a 2000 pound vehicle 10 can pick up at least 300 pounds since its fuselage can endure shocks in excess of 500 Gs due the strong cylinder fuselage.

Fuel bladder system 160 includes fuel bladder 162, pickup loop 164 of a predetermined loop size and a reel mechanism (depicted at 166 in FIG. 18) to retract at least one side of the pickup loop to reduce the loop size. The pick up loop size is about one or two meters in diameter. The predetermined loop size depends on how accurately vehicle 10 can navigate and snare the fuel bladder.

In FIG. 18, vehicle includes cylinder 170 forming a fuselage of the vehicle in the aeroplane configuration, opening 172 in cylinder 170 forming an opening into a fuel bladder stowage chamber within the cylinder, retractable hook 174, bladder discard solenoid 176, bladder discard pusher 177, fuel intake tube 178 capable of drawing fuel from an external fuel bladder (i.e., fuel bladder 162 of FIG. 17) stowed in the stowage chamber, and fuel transfer line 179 connected to intake tube 178. The retraction mechanism used to retract hook 174 advantageously includes shock absorbing means to lessen the pick up shock to vehicle 10.

The fuel bladder system further includes a snag sensor to sense when the pickup loop has been hooked by an aeroplane hook the snag sensor initiating reel mechanism 166 to retract at least one side of the pickup loop to reduce the loop size and snug the loop around hook 174 (see FIG. 18).

The pickup loop is deployed at some random orientation. The fuel bladder system further includes a compass to sense the random orientation, a radio navigation receiver to sense a location of the fuel bladder, and a transmitter to transmit the random orientation and the location. The vehicle includes a receiver to receive the random orientation and the location.

When the vehicle is nearly out of fuel, the vehicle navigates to a fuel bladder pick up point. With precision differential GPS navigation, position accuracies of 0.3 meters are achievable. With a flux compass, the orientation of the pick up loop can be sensed. The vehicle navigates to the fuel bladder pick up point and extends its retractable hook. Retracable hook 174 includes a hook sensor to detect when an external fuel bladder has been hooked. A predetermined time after hook sensor detects that the fuel bladder has been hooked, a vehicle reel mechanism reels in retractable hook 174. As fuel bladder 162 is drawn into stowage chamber 172 by retractable hook 174, fuel bladder intake port 178 engages fuel bladder 162 and fuel is pumped from the external fuel bladder just loaded into an internal fuel tank by fuel pump 180.

When all fuel has been drawn from the external fuel bladder, the wire loop is cut internally by a cut mechanism, and the expended fuel bladder is pushed out of stowage chamber 172 by bladder discard solenoid 176. Bladder discard solenoid 176 with its pusher piston pushes the bladder backwards off of fuel bladder intake port 178, and the expended fuel bladder falls to the ground.

The internal fuel tank holds sufficient fuel to maintain flight during the next refueling cycle.

Preferred launch accelerations would be 100 Gs to 4000 Gs where 1 G= acceleration of gravity equal to 9.8 meters per second per second.

Operative launch velocities would be 10 m/sec to 15,000 n/sec. Preferred launch velocities would be 20 m/sec to 1500 n/sec.

The vehicle would be expended after completion of its cruise flight and allowed to crash land at full flight velocity in a vertical or shallow dive. The vehicle would be undamaged by this crash landing either in water or on land and could optionally be recovered and reused at a later time without refurbishment other than refueling. The vehicle could optionally be intentionally destroyed by an explosive or pyrotechnic device immediately upon crash landing or at a later preprogrammed or commanded time.

The vehicle, during flight, optionally would autonomously or upon command perform a landing and relaunch maneuver using a combustion driven piston attached to the vehicle to leap from the ground into the air at sufficient velocity to attain stable flight.

The vehicle could autonomously or upon command fly over a prepositioned fuel bladder on the water or land and use a trailing hook to grab the fuel bladder during the fly over. The fuel bladder would then be reeled into a docking position for fuel transfer. The very high strength of the vehicle structural design and the very large design velocity range of the vehicle would enable capture of fuel bladders with a large fraction of the vehicle body weight without over stress or stall of the flight vehicle. Differential or kinematic GPS navigation would be used to rendezvous with the bladder with optional augmentation by a laser or millimeter wave emitter on the bladder and a receiver on the flight vehicle.

Military munition mass production materials and processes are used to fabricate an unmanned aerial vehicle resulting in low production costs and the ability to withstand very high launch, flight, and recovery stresses without damage. This includes an airframe design based on a simple one piece tube construction using low cost thin wall steel or composite tubes fabricated by automotive or munitions mass production techniques.

The tube features a long length to diameter ratio to maximize aerodynamic performance. This design enables airframe body operation both at high speeds up to Mach 5 and low speeds to Mach 0.1. The airframe design features the ability to reversibly transform from a high speed to a low speed flight configuration. The high speed configuration features small, high strength foldout or fixed fins, canards, or other surfaces appropriate for stabilization and control of the flight vehicle at speeds of Mach 0.5 to Mach 40, preferably Mach 0.5 to Mach 5.0.

The low speed flight configuration features an inflatable wing, with an option for an inflatable tail and inflatable control surfaces. The low speed configuration is designed for stabilization and control of the flight vehicle at speeds of Mach 0.5 down to Mach 0.02, preferably Mach 0.06 to Mach 0.3. The inflatable surfaces and wings can have shape, size, and geometry which vary with inflation pressure.

The inflation system may be driven by a cold gas generation system supplemented or replaced by an engine driven compression system. The cold gas generation system may optionally utilize hydrogen which can be reversibly stored in a chemical canister. A large hydrogen inflated wing optionally can provide lift force sufficient to partially or completely counteract gravity to enable hover to be achieved with low or zero constant thrust.

A combination of a low cost internal combustion engine and parallel electric motor/generator would be used for low speed or hover propulsion with a folding propeller. The internal combustion engine would be optimized for minimum power and fuel consumption. The engine would be started in flight using the electric motor powered from a battery. The engine would propel the vehicle in flight and drive the parallel electric motor/generator to provide substantial electrical power to vehicle systems such as high power communications devices and a rechargeable battery. When very quiet operation is needed, the combustion engine is turned off and the vehicle is propelled using the electric motor drive.

A jet turbine or ramjet engine would optionally be used to sustain higher speed cruise flight, or to return to high speed flight after low speed cruise flight. The inflatable wings and other inflatable structures would be retraced for high speed flight or for controlled crash landings.

The vehicle combustion engine or engines would utilize heavy fuels with low vapor pressures to reduce fire and explosion hazards. The internal combustion engine fuel would optionally utilize metallic additives with very small particle sizes to enhance engine power and cruise endurance. These additives would optionally include but would not be limited to boron, aluminum, lithium, or magnesium.

Operative particle sizes would be 0.001–1 microns.

Preferred particle sizes would be 0.003.0.05 microns.

The high strength and structural efficiency of the invention enables maximization of the vehicle's effective payload fraction. This enables the vehicle to carry a large payload consisting of various modular combinations of fuel, sensors, communications systems, and weapons. The vehicle can thereby provide a large variety of mission capabilities depending on the configuration of its modular payload.

The invention enables almost immediate dropping of payloads onto targets based on sensor inputs with or without human decision making and intervention. The invention also enables flexible, immediate, and cost effective launch of overhead communications relay functions such as cellular telephone or other communications relay and switching functions.

This unmanned aerial vehicle (UAV) is gun launched. The UAV may be launched from various forms of Navy shipboard guns or Army field guns and mortars. The acceleration forces experienced with such a launch would destroy known UAVs. Known UAVs are designed to be catapult launched, but catapults do not deliver anywhere near the same accelerations that guns would impart to the UAV.

The fuselage of the UAV is preferably a cylindrical tube with a length to diameter ratio of about 24 to 1 into and onto which is mounted the components that makes up the UAV. The tube is preferably formed of steel or a lightweight structural composite material. In an exemplary embodiment, the tube is 120 inches long, 5 inches in diameter and one-quarter of an inch in thickness. Such a tube is designed to operate with longitudinal accelerations up to 100,000 Gs. In contrast, known UAV are unable to survive longitudinal accelerations of 50 Gs.

Similarly, the lateral acceleration capability of the preferred embodiment is in excess of 4,000 Gs. In contrast known UAVs are unable to survive lateral accelerations of 20 Gs.

The present UAV also includes a unique wing structure. There are at least two unique sets of control surfaces designed to control the UAV during distinct flight modes. A first mode is during and just after gun launch and may be characterized as ballistic cruise. In this first mode, small and relatively stiff control surfaces are deployed and controlled by a first mode autopilot. A second mode is during a second half of the mission or during terminal operation. In this second mode, larger inflatable wings are deployed and controlled by a second mode autopilot. A single autopilot may be used with two modes to control the control surfaces of the two flight modes.

To transition from the first to the second flight mode, the UAV may be controlled to enter a climb and stall. When the air speed is low enough, inflatable wings and control surfaces are deployed and a small engine and propeller are engaged to give the UAV thrust.

Once the UAV is in the inflatable wing flight mode, it may re-enter a high speed flight mode with the help of a jet engine. The UAV includes a jet turbine or ramjet engine to enter a high speed cruise mode after the inflatable flight mode. The inflatable wings are deflated and stowed, smaller wings and canards are deployed, and the jet engine engages to provide thrust.

In inflatable wing mode, the UAV may enter a hover state. The inflatable wings are filled with hydrogen to provide neutral buoyancy. The small engine and propeller provide thrust. Changing the pressure on the wings changes their shape. The wings may be easily reshaped for efficient cruise operation, then reshaped again to provide loiter or even hover operation. And as discussed above, the inflatable wings may be deflated and stowed, and then the jet engine is engaged and fast cruise flight entered with the help of small deployable cruise wings.

The UAV includes a tail hook to pick up a fuel or other bladder. The strength of the UAV enables the bladder to weigh up to 5% or 15% of the weight of the UAV.

The UAV is a payload delivery device that uses gun launch and ballistic cruise to rapidly ingress, followed by a more controlled flight mode. The UAV includes sensor packages (e.g., TV, imaging IR, etc.) that is relayed to a ground observer. During the inflated wing flight mode a ground controller receives a signal from the UAV that carries the sensor's image. Using the sensor's image, the ground controller may deliver a weapon payload to a confirmed ground target or deliver a relief package payload to a stranded aviator.

The UAV may advantageously be used for a forward air support munition (FASM) and carry a variety of payload packages including sensors, munitions and communications (COM). In this role it provides support at ranges beyond 100 nautical miles (nmi) and is suitable for such missions as command, control, communications, countermeasures and intelligence (C41) or battle damage assessment (BDA) or extended range guided munition (ERGM). In the terminal area, the UAV establishes communications with a forward observer or forward air controller (FOFAC) who can assist in final targeting. The UAV can be launched from present Navy guns (e.g., Mk45 gun) or existing 155 millimeter Army or Marine guns or advanced Navy guns such as a vertical gun for advanced ships (VGAS).

The UAV includes an inflatable wing for long duration cruise flight guided by the global positioning system (GPS) and/or an inertial measurement unit (IMU) and/or other sensors for navigation (NAV). The payload bays carry from 2 to 8 submunitions that when guided by the navigation system are capable of providing a bombing accuracy circular error probability (CEP) better than 5 meters (more than 50% of the bombs will fall within 5 meters of the target). The level of accuracy enables higher probability of kill (pk) with small munitions.

Having described preferred embodiments of a novel transformable gun launched aero vehicle (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims.

What is claimed is:

1. A transformable gun launched aero vehicle having a ballistic projectile configuration and an aeroplane configuration, the vehicle comprising:

a cylinder forming a shell of the vehicle in the ballistic projectile configuration; and wings deployable from the cylinder, the wings being capable of achieving sufficient lift for sustained flight in the aeroplane configuration, the cylinder forming a fuselage of the vehicle in the aeroplane configuration.

2. A transformable gun launched aero vehicle having a ballistic projectile configuration and an aeroplane configuration, the vehicle comprising:

a cylinder forming a shell of the vehicle in the ballistic projectile configuration; and wings deplorable from the cylinder, the wings being one of inflatable wings and unfoldable wings, the cylinder forming a fuselage of the vehicle in the aeroplane configuration, wherein the wings are inflatable and a first wing includes:

plural rib elements;

plural inflatable tubes, each tube being braced by the plural rib elements; and a wind shell disposed around the plural inflatable tubes and the plural rib elements.

3. The vehicle of claim 2, wherein:

each rib element has plural apertures disposed therethrough, each aperture corresponding to a respective tube; and each tube is disposed in and through a corresponding aperture of each rib element.

4. The vehicle of claim 3, wherein:

before the first wing is inflated, the rib elements are disposed adjacent to each other, each tube being accordion pleat folded into corresponding apertures in the plural rib elements so that the uninflated wing is stowed within the format of the cylinder; and after the first wing is inflated, each inflatable tube is inflated so that the tube becomes substantially rigid and the plural rib elements are spaced apart at predetermined stations along the inflated tubes so that the wing is extended.

5. The vehicle of claim 2, wherein the first wing includes an articulateable aileron.

6. The vehicle of claim 5, wherein:

each rib element has plural apertures disposed therethrough, each aperture corresponding to a respective tube;

each tube is disposed in and through a corresponding aperture of each rib element;

an aft aperture in each rib element includes a sleeve in which an aft tube of the plural tubes is rotatably disposed;

the first wing further includes plural aileron ribs fixedly attached to the aft tube; and the vehicle further includes an aileron control mechanism to rotate the aft tube.

7. A transformable gun launched aero vehicle having a ballistic projectile configuration and an aeroplane configuration, the vehicle comprising:

a cylinder forming a shell of the vehicle in the ballistic projectile configuration;

wings deployable from the cylinder, the wings being one of inflatable wings and unfoldable wings, the cylinder forming a fuselage of the vehicle in the aeroplane configuration; and an inflatable tail section that is inflated while the vehicle is in the aeroplane configuration.

8. The vehicle of claim 7, wherein the inflatable tail section includes an articulateable rudder.

9. The vehicle of claim 7, wherein the inflatable tail section includes an articulateable elevator.

10. The vehicle of claim 7, wherein the inflatable tail section includes an articulateable rudder and an articulateable elevator.

11. The vehicle of claim 7, wherein the wings are inflatable and a first wing includes:

plural rib elements;

plural inflatable tubes, each tube being braced by the plural rib elements; and a wind shell disposed around the plural inflatable tubes and the plural rib elements.

12. A transformable gun launched aero vehicle having a ballistic projectile configuration and an aeroplane configuration, the vehicle comprising:

a cylinder forming a shell of the vehicle in the ballistic projectile configuration; and wings deployable from the cylinder, the wings being one of inflatable wings and unfoldable wings, the cylinder forming a fuselage of the vehicle in the aeroplane configuration, wherein the cylinder includes a forward cylinder part and an aft cylinder part joined at a docking joint that maintains alignment between the forward cylinder part and the aft cylinder part during gun launch compression and during rebound tension.

13. A transformable gun launched aero vehicle having a ballistic projectile configuration and an aeroplane configuration, the vehicle comprising:

a cylinder forming a shell of the vehicle in the ballistic projectile configuration; and wings deployable from the cylinder, the wings being one of inflatable wings and unfoldable wings, the cylinder forming a fuselage of the vehicle in the aeroplane configuration, wherein:

the cylinder includes a forward cylinder part and an aft cylinder part joined at a docking joint; and the docking joint includes a rotation mechanism to rotate the forward cylinder part relative to the aft cylinder part.

14. The vehicle of claim 13, wherein the rotation mechanism includes a spring powered rotation drive to rotate the forward cylinder part relative to the aft cylinder part until a detent signals rotational alignment between the forward cylinder part with the aft cylinder part.

15. The vehicle of claim 13 further including an inflatable tail section that is inflated while the vehicle is in the aeroplane configuration.

16. The vehicle of claim 13, wherein the wings are inflatable and a first wing includes:

plural rib elements;

plural inflatable tubes, each tube being braced by the plural rib elements; and a wind shell disposed around the plural inflatable tubes and the plural rib elements.

17. The vehicle of claim 13 further including an inflatable tail section that is inflated while the vehicle is in the aeroplane configuration, wherein the wings are inflatable and a first wing includes:

plural rib elements;

plural inflatable tubes, each tube being braced by the plural rib elements; and a wind shell disposed around the plural inflatable tubes and the plural rib.

18. A transformable gun launched aero vehicle having a ballistic projectile configuration and an aeroplane configuration, the vehicle comprising:

a cylinder forming a shell of the vehicle in the ballistic projectile configuration;

wings deployable from the cylinder, the cylinder forming a fuselage of the vehicle in the aeroplane configuration; and a fuel tank that includes two spaced apart bulkhead walls sealed to an inside surface of the cylinder to define the fuel tank therebetween.

19. The vehicle of claim 18, wherein:

the fuel tank includes a displacement bladder; and the vehicle further includes a pump mechanism to force fuel from the displacement bladder.

20. The vehicle of claim 19, wherein the cylinder includes a forward cylinder part and an aft cylinder part joined at a docking joint.

21. The vehicle of claim 20 further including an inflatable tail section that is inflated while the vehicle is in the aeroplane configuration.

22. The vehicle of claim 20, wherein the wings are inflatable and a first wing includes:

plural rib elements;

plural inflatable tubes, each tube being braced by the plural rib elements; and a wind shell disposed around the plural inflatable tubes and the plural rib elements.

23. The vehicle of claim 20 further including an inflatable tail section that is inflated while the vehicle is in the aeroplane configuration, wherein the wings are inflatable and a first wing includes:

plural rib elements;

plural inflatable tubes, each tube being braced by the plural rib elements; and a wind shell disposed around the plural inflatable tubes and the plural rib elements.

24. The vehicle of claim 19 further including an inflatable tail section that is inflated while the vehicle is in the aeroplane configuration.

25. The vehicle of claim 19, wherein the wings are inflatable and a first wing includes:

plural rib elements;

plural inflatable tubes, each tube being braced by the plural rib elements; and a wind shell disposed around the plural inflatable tubes and the plural rib elements.

26. The vehicle of claim 19 further including an inflatable tail section that is inflated while the vehicle is in the aeroplane configuration, wherein the wings are inflatable and a first wing includes:

plural rib elements;

plural inflatable tubes, each tube being braced by the plural rib elements; and a wind shell disposed around the plural inflatable tubes and the plural rib elements.

27. A transformable gun launched aero vehicle having a ballistic projectile configuration and an aeroplane configuration, the vehicle comprising:

a cylinder forming a shell of the vehicle in the ballistic projectile configuration;

wings deployable from the cylinder, the cylinder forming a fuselage of the vehicle in the aeroplane configuration; and a parachute that is reversibly deployable from a nose portion of the vehicle while the vehicle is in the aeroplane configuration.

28. A transformable gun launched aero vehicle having a ballistic projectile configuration and an aeroplane configuration, the vehicle comprising:

a cylinder forming a shell of the vehicle in the ballistic projectile configuration;

wings deployable from the cylinder, the wings being one of inflatable wings and unfoldable wings, the cylinder forming a fuselage of the vehicle in the aeroplane configuration;

at least one landing rod, each landing rod being reversibly extendable from the vehicle; and a landing controller, the landing controller controlling a first landing rod to extend after the vehicle has begun to vertically descend.

29. The vehicle of claim 28, wherein the first landing rod includes a landing rod end and a reversibly inflatable foot, the landing controller controlling the foot of the first landing rod to inflate from the landing rod end after the first landing rod is extended to a landing length.

30. The vehicle of claim 29, further including a drive mechanism, the landing controller controlling the drive mechanism to rapidly extend all landing rods of the at least one landing rod to a launch length greater than the landing length, the rapid extension imparting sufficient vertical velocity to the vehicle to launch the vehicle.

31. The vehicle of claim 30, further comprising:

an engine; and a propeller driven by the engine, wherein the landing controller deflates the reversibly inflatable feet and retracts the landing rods after the vehicle is launched and controls the engine to drive the propeller.

32. A transformable gun launched aero vehicle having a ballistic projectile configuration and an aeroplane configuration, the vehicle comprising:

a cylinder forming a shell of the vehicle in the ballistic projectile configuration;

wings deployable from the cylinder, the cylinder forming a fuselage of the vehicle in the aeroplane configuration;

a folding propeller deployable from the fuselage in the aeroplane configuration; and an engine coupled to the propeller.

33. A transformable gun launched aero vehicle having a ballistic projectile configuration and an aeroplane configuration, the vehicle comprising:

a cylinder forming a shell of the vehicle in the ballistic projectile configuration;

wings deployable from the cylinder, the wings being one of inflatable wings and unfoldable wings, the cylinder forming a fuselage of the vehicle in the aeroplane configuration;

a propeller deployable from the fuselage in the aeroplane configuration;

an engine coupled to the propeller; and a control system, the control system including a module to determine when the vehicle has reached a first predetermined state, the first predetermined state defining an initiation of a transition from the ballistic projectile configuration to the aeroplane configuration.

34. The vehicle of claim 33, wherein the module to determine when the vehicle has reached the first predetermined state includes at least one of an inertial navigation sensor, an air speed sensor, an altimeter, a radio navigation sensor, an optical system sensor, a magnetic sensor, an electrostatic sensor and a timer to measure time from launch.

35. The vehicle of claim 33, further comprising a parachute deployable from an aft portion of the cylinder, the control system including a module to deploy the parachute after the vehicle has reached the first predetermined state.

36. The vehicle of claim 35, wherein the control system includes a module to deploy the wings after the parachute is deployed.

37. The vehicle of claim 36, wherein the control system includes:

a module to detach the parachute after the wings are deployed; and a module to deploy the propeller after the parachute is detached.

38. The vehicle of claim 37, wherein the control system includes a module to operate the engine after the parachute is detached and the propeller is deployed.

39. The vehicle of claim 33, wherein the control system includes a module to deploy the propeller and the wings after the vehicle has reached the first predetermined state.

40. The vehicle of claim 39, wherein the control system includes a module to operate the engine when the propeller is deployed.

41. The vehicle of claim 33, wherein:

the vehicle includes canards; and the control system includes a module to articulate the canards so that a flight of the vehicle is altered to a second predetermined state after the vehicle has reached the first predetermined state.

42. The vehicle of claim 41, wherein the control system includes a module to deploy the propeller and inflate the wings after the vehicle has reached the second predetermined state.

* * * * *

UNITED STATES PATENT AND TRADEMARK OFFICE
CERTIFICATE OF CORRECTION

PATENT NO. : 6,260,797 B1
DATED : July 17, 2001
INVENTOR(S) : Miles R. Palmer

It is certified that error appears in the above-identified patent and that said Letters Patent is hereby corrected as shown below:

Column 16, claim 17,
Line 5, -- elements -- has been inserted after the word "rib".

Signed and Sealed this

Ninth Day of April, 2002

Attest:

Attesting Officer

JAMES E. ROGAN
Director of the United States Patent and Trademark Office